(12) United States Patent
Ingeson

(10) Patent No.: US 8,608,911 B2
(45) Date of Patent: Dec. 17, 2013

(54) DESALINATION DEVICE

(76) Inventor: Rolf Ingeson, Eskilstuna (SE)

( * ) Notice: Subject to any disclaimer, the term of this patent is extended or adjusted under 35 U.S.C. 154(b) by 0 days.

(21) Appl. No.: 13/697,457

(22) PCT Filed: Apr. 6, 2011

(86) PCT No.: PCT/SE2011/050413
§ 371 (c)(1),
(2), (4) Date: Nov. 12, 2012

(87) PCT Pub. No.: WO2011/142706
PCT Pub. Date: Nov. 17, 2011

(65) Prior Publication Data
US 2013/0056345 A1 Mar. 7, 2013

(30) Foreign Application Priority Data
May 11, 2010 (SE) ...................................... 1050465

(51) Int. Cl.
*B01D 3/08* (2006.01)
*B04B 5/02* (2006.01)
*C02F 1/38* (2006.01)

(52) U.S. Cl.
USPC ........ 202/238; 202/234; 202/262; 202/267.1; 494/34; 494/44; 494/46

(58) Field of Classification Search
USPC ......... 202/120, 234, 238, 262, 267.1; 203/10, 203/11, 86; 494/31–34, 36, 44, 46
See application file for complete search history.

(56) References Cited

U.S. PATENT DOCUMENTS

| | | | | |
|---|---|---|---|---|
| 3,312,600 | A | * | 4/1967 | Morton .......................... 202/160 |
| 3,669,879 | A | * | 6/1972 | Berriman ....................... 210/652 |
| 4,512,394 | A | | 4/1985 | Kauffman |
| 6,966,874 | B2 | * | 11/2005 | Cornay et al. .................. 494/33 |

(Continued)

FOREIGN PATENT DOCUMENTS

| | | |
|---|---|---|
| CN | 101282912 | 10/2008 |
| CN | 101679076 | 3/2010 |

(Continued)

OTHER PUBLICATIONS

International Search Report for PCT/SE2011/050413, Completed by the Swedish Patent Office on Aug. 15, 2011, 5 Pages.

(Continued)

*Primary Examiner* — Nina Bhat
*Assistant Examiner* — Jonathan Miller
(74) *Attorney, Agent, or Firm* — Brooks Kushman P.C.

(57) ABSTRACT

A device for desalination of water having an inlet for saltwater, a first inner container arranged rotatable around an axis, a second container having an evaporation surface, a heater for heating of the second container and thereby also the evaporation surface, and a motor arranged to rotate the containers around the axis of rotation. The second container encloses the first inner container and is connected fixed to the first inner container. A mechanism for distributing water on the evaporation surface is constituted by holes arranged in the container wall of the first inner container so that water may pass out to the second container. Holes are also arranged in the container wall of the second container so that steam may pass out from the second container. A condensation surface is arranged for condensation of steam which passes out through the holes in the container of the second container.

17 Claims, 2 Drawing Sheets

(56) References Cited

U.S. PATENT DOCUMENTS

| | | | |
|---|---|---|---|
| 7,160,469 B2 * | 1/2007 | Mayer et al. | 210/695 |
| 7,189,196 B2 * | 3/2007 | Cornay et al. | 494/31 |
| 2004/0261952 A1 | 12/2004 | Hart et al. | |
| 2010/0258426 A1 | 10/2010 | Ng et al. | |
| 2011/0174605 A1 * | 7/2011 | Ugolin | 203/10 |

FOREIGN PATENT DOCUMENTS

| | | |
|---|---|---|
| FR | 2789381 | 8/2000 |
| JP | 07155742 | 6/1995 |
| JP | 2001129534 | 5/2001 |
| JP | 2005144328 | 6/2005 |
| WO | 2008142782 | 11/2008 |

OTHER PUBLICATIONS

Website http://epochtimes.com/tools/printer.asp?id=56695, Dated Jun. 23, 2007, Retrieved on May 4, 2010, Trought, English translation attahched to original, "Desalination Not the Solution to a Thirsty World, Says Report." All together 3 Pages.

Fang., World Science Dec. 31, 2008, No. 8, English Translation attached to original, All together 11 Pages, "Sea Water Desalination in the Past and the Present."

Qifeng et al. Construction Science and Technology Dec. 31, 2009, No. 16, English Translation attached to original, All together 7 Pages, "Desalting Technology of Salt-rich Water and the Development Trend Thereof.".

English Translation to Chinese Search Report for Application No. 201180022739.7, Dated Jun. 20, 2013, 1 Page.

* cited by examiner

DESALINATION DEVICE

CROSS-REFERENCE TO RELATED APPLICATION

This application is the U.S. national phase of PCT Appln. No. PCT/SE2011/050413 filed on Apr. 6, 2011, which claims priority to Swedish Patent Application No. 1050465-2 filed on May 11, 2010, the disclosures of which are incorporated in their entirety by reference herein.

TECHNICAL FIELD

The present invention relates to a desalination device for desalination of sea water and to a method for desalination of sea water. Most specifically the present invention relates to a desalination facility.

DESCRIPTION

Drinking water is in short supply in a considerable part of the world. This is one of the reasons why desalination of sea water has become an increasingly popular method to create drinking water. The article "Desalination Not the solution to a thirsty world, says report"; (http://en.epochtimes.com/news/7-6-23/56695.html describes desalination of sea water to create drinking water. Desalination means that salt and minerals which are dissolved in the sea water are removed. This is achieved by heating the sea water until the water is evaporated to steam, which is then condensed. During the evaporation essentially all salt and minerals are left behind, so that the separated water contains essentially no salts or minerals whatsoever. The facilities that exist today are mostly large scale facilities which are connected to existing water pipe systems. However, there is a need for small scale desalination facilities for production of drinking water to smaller groups of users.

An alternative to said method for creating drinking water is to use devices in which sea water under high pressure is pressed through membranes which do not allow passage of salt ions. Such devices are available in suitable size for smaller groups of users, however, the high pressure requirement renders the device complicated to use.

The Japanese patent application JP 2005144328 A describes a device for distillation of sea water which relies on evaporation of water. A wind propeller drives a shaft which is arranged inside a pipe. The space between the pipe and the shaft is filled with a heat transmission medium. The heat transmission medium and the surrounding pipe are heated by the friction when the shaft is rotating. Sea water is allowed to pass in contact with the pipe, wherein water is evaporated. The evaporated water is condensed and collected.

SUMMARY OF THE INVENTION

An objective of the present invention is to provide a device for desalination of water, which is a simpler alternative to known devices.

A further objective of the present invention is to provide a device for desalination of water which is simple and inexpensive to produce.

At least one of these objectives is fulfilled with a desalination device and a method according to the independent claims.

Further advantages with the invention are provided with the features of the dependent claims.

According to a first aspect of the present invention a device is provided for desalination of water, comprising an inlet for saltwater, an evaporation surface for evaporation of the saltwater, means for heating the evaporation surface, means for distributing the water on the evaporation surface and a condensation surface for condensation of the evaporated water. The device is characterized in that it comprises a first inner container with a first container wall which is arranged rotatable around an axis of rotation, a second container with a second container wall the inside of which constitutes the evaporation surface, heating means for heating of the second container and thereby also the evaporation surface, and a motor which is arranged to rotate the containers around the axis of rotation. The second container encloses the inner container and is arranged fixed to the inner container. The means for distributing the water on the evaporation surface is constituted by first holes which are arranged in the wall of the first inner container so that water may pass out to the second container. Second holes are arranged in the wall of the second container so that steam may pass out of the second container, and the condensation surface is arranged for condensation of the steam passing out through the second holes in the wall of the second container.

With the device according to the invention a compact device for production of drinking water is provided. During operation of the device the second container is heated so that water which hits the second container is evaporated. The steam is transported out through the second holes in the container wall of the second container and is condensed against the condensation surface.

The device may comprise a third outer container with a third container wall which encloses the second container and which is fixed in relation to the motor, wherein the inside of the third container wall constitutes the condensation surface, and wherein the third outer container comprises an outlet for condensed water. With such a third outer container a condensation surface which the steam easily comes in contact with, is provided in a simple way.

The third outer container may comprise an outlet for gas, wherein lowering of the pressure in the third outer container is enabled. By lowering the pressure in the third outer container the transport of steam out from the second container is supported. In principle steam is sucked out from the second container.

A cooling device may be arranged on the third container for cooling of the third container wall. The cooling device may be arranged as any cooling device. For example, the cooling device may comprise coolant pipes which are in contact with the third container wall. The coolant may be provided in a large number of different ways. It is not necessary for the function of the device to have a cooling device arranged on the third container wall; the device could be cooled by a flow of cool gas or liquid which is made to pass across the third container.

According to a preferred embodiment the first holes in the first container wall do not overlap the second holes in the second container wall, seen perpendicularly to any of the container wall surfaces. In this way it is avoided that water which leaves the first inner container through the first holes in the first container wall pass on directly through the second holes in the second container wall.

The first container and the second container may be suspended in a first bearing on one side of the second container and a second bearing on the other side of the second container, wherein the axis of rotation extends through the bearings and wherein the inlet for saltwater is arranged centrally axially through one of the bearings. With such an arrangement supply of saltwater may be provided in a simple way. Furthermore, a stable suspension of the first container and the second container is provided.

The axis of rotation may be arranged essentially vertically. This facilitates the provision of saltwater to the first inner container as water then may be allowed to flow down in the inner container. Furthermore, the entire perimeter of the first container is used in an efficient way during operation.

The inlet may be arranged in an inlet pipe which extends along the axis of rotation through the first container. With such an inlet pipe the vertical distribution of incoming water to the first inner container may be controlled in an efficient way.

The inlet pipe may be provided with a number of inlet pipe holes through which saltwater from the inlet enters into the first container. Alternatively the inlet pipe may be provided with an elongated slit which extends along the inlet pipe.

The second container may comprise a magnetisable material, wherein the means for heating the evaporation surface comprises magnetic induction of eddy currents in the magnetic material. The eddy current dissipates as heat to the container. This is an alternative for method of heating of the second container. Another alternative is electrical heating of the second container.

The device may comprise a means for applying a voltage between the first container and the second container. By arranging such a voltage, accumulation of salt ions on the outside surface of the first container and the inside surface of the second container is provided in a surprising way. Thereby the efficiency of the device is increased. Without such a voltage applied between the containers, salt will accumulate primarily on the evaporation surface.

The second container may be essentially cylindrical and have a diameter in the interval 0.2-5 meters, preferably in the interval 0.5-1 meter. These are suitable dimensions for being able to provide drinking water production for a family.

The distance between the first container and the second container may be 0.01-0.3 meters, and preferably 0.03-0.06 meters. This is a suitable distance in order to be able to separate the salt ions with an electrical voltage.

The first and second holes in the first inner container and in the second container, respectively, may have a length in the plane of the container wall which is 0.002-0.05 meters, preferably 0.005-0.01 meters. These are suitable dimensions in order to provide for proper function of the device.

SHORT DESCRIPTION OF THE DRAWINGS

In the following preferred embodiments of the invention will be described with reference to the appended drawings on which:

DESCRIPTION OF PREFERRED EMBODIMENTS

Figure 1:
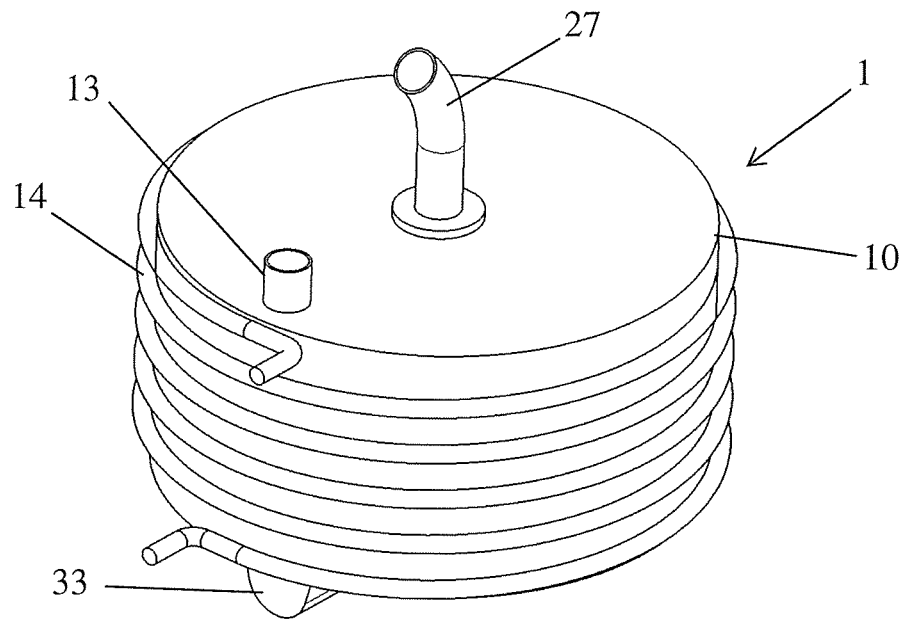
FIG. 1 shows a perspective view of a device for desalination of water according to an embodiment of the present invention.

In the following description of preferred embodiments of the invention the same reference numerals will be used for the same feature in the different figures. The figures are not drawn to scale.

Figure 2:
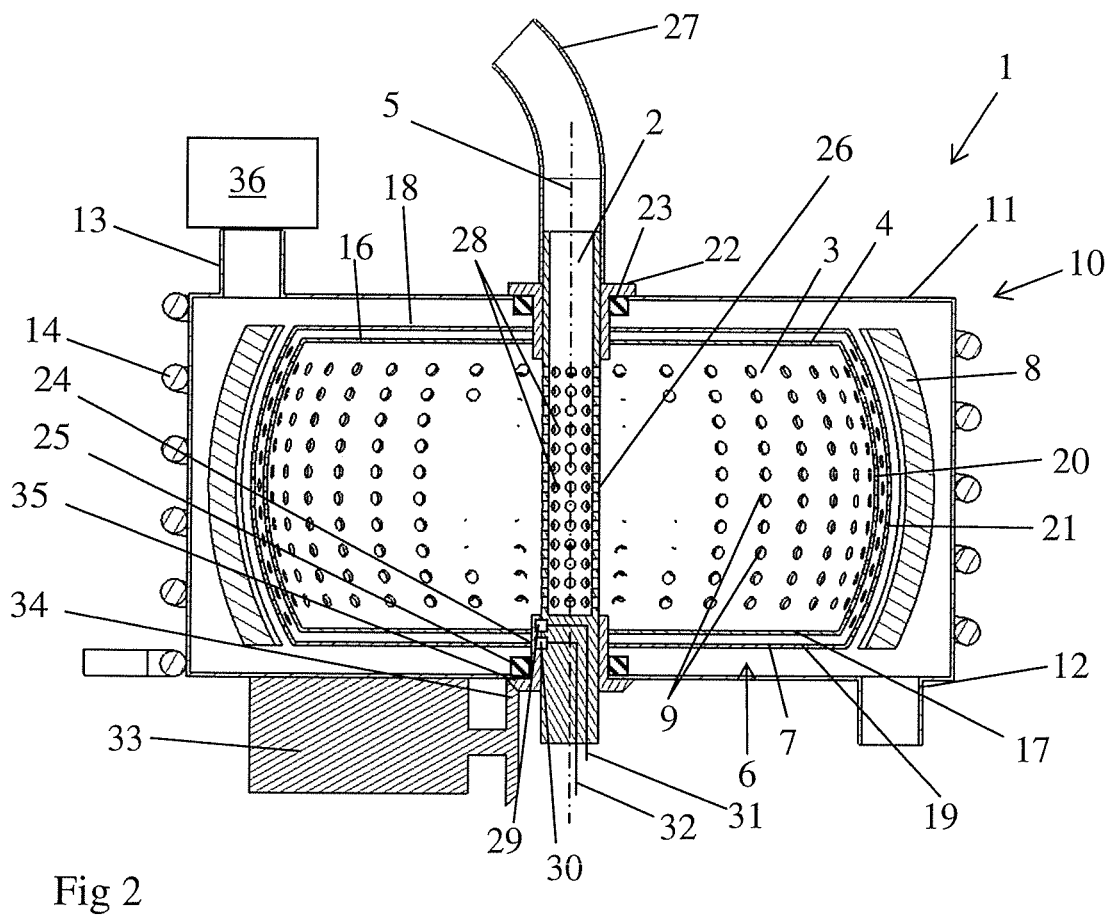
FIG. 2 shows a cross section from the side of the device in FIG. 1.
Figure 3:
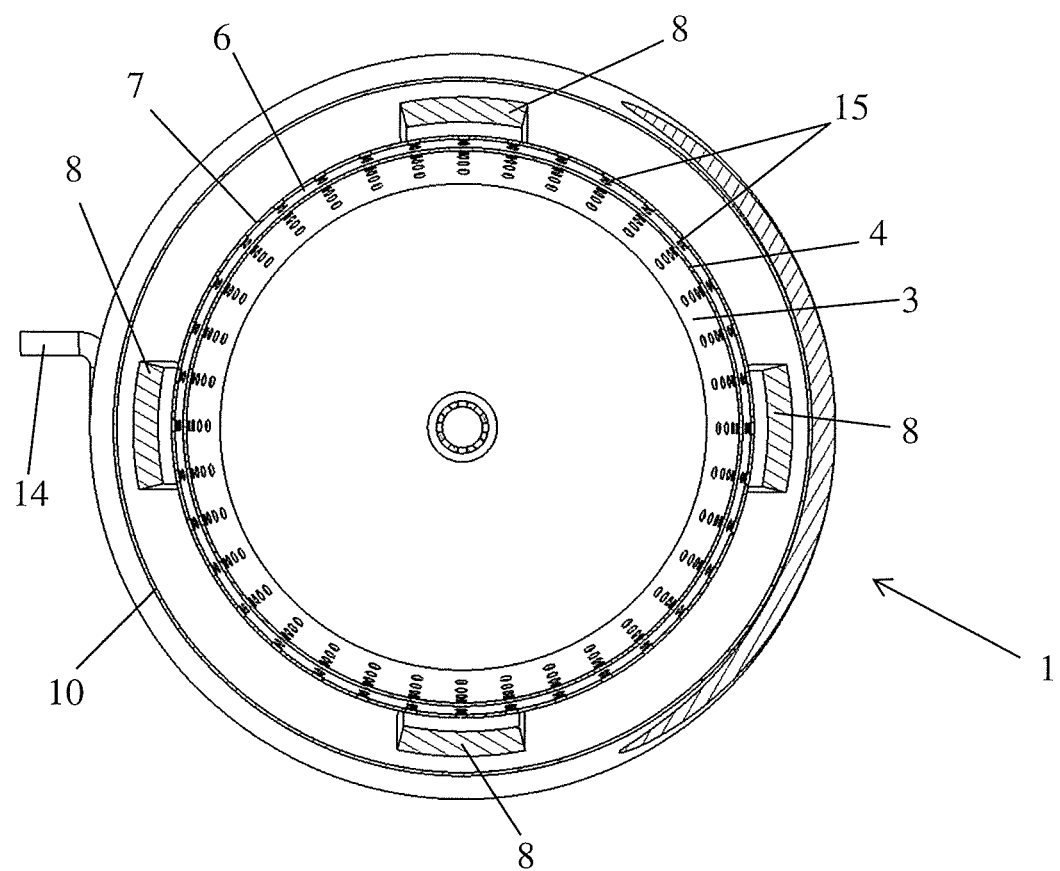
FIG. 3 shows a cross section from above of the device in FIG. 1 and FIG. 2.

FIG. 1 shows a perspective view of a device 1 for desalination of water according to an embodiment of the present invention. FIG. 2 shows a cross section from the side of the device 1 in FIG. 1. FIG. 3 shows a cross section from above of the device 1 in FIG. 1 and FIG. 2. The device 1, comprises an inlet 2 for saltwater, a first inner container 3 with a first container wall 4 which is arranged rotatable around an axis of rotation 5. The device 1 comprises also a second container 6 with a second container wall 7 the inside of which constitutes an evaporation surface, and heating means 8 for heating of the second container 6 and thereby also the evaporation surface. The second container 6 encloses the inner container 3 and is arranged fixed to the inner container 3. First holes 9 are arranged in the container wall 4 of the first inner container 3 so that water may pass out from the first container 3 to the second container 6. The first holes constitute a means for distributing water on the evaporation surface. The second container wall 7 is composed of magnetisable material and the heating means 8 works by magnetic induction of eddy currents in the magnetisable material of the second container wall 7 in order to thereby heat the evaporation surface. From FIG. 3 it is evident that the heating means 8 comprises 4 magnetisation means evenly distributed around the second container 6. Second holes 15 are arranged in the second container wall 7. Water that is evaporated at contact with the evaporation surface may leave the second container 6 through said second holes 15. The first holes 9 in the first container wall 4 do not overlap the second holes in the second container wall, seen perpendicularly to any of the container wall surfaces. It is thereby avoided that water that flows out through the first holes 9 in the first container wall 4 flows directly out through the second holes 15 in the second container wall 7 without first coming into contact with the evaporation surface, i.e. the inside of second container 6.

The device also comprises a motor 33 which is arranged to rotate the container 3, 6, around the axis of rotation 5. A device according to the shown invention also comprises a third outer container 10 with a third container wall 11 which encloses the second container 6 and which is fixed in relation to the motor 33. The inside of the third container wall 11 is arranged for condensation of steam which passes out through the second holes 15 in the wall 7 of the second container 6. The third outer container 10 comprises an outlet 12 for condensed water, which outlet 12 is arranged in the bottom of the third container 10. The third outer container 10 also comprises a gas outlet 13. The gas outlet 13 enables lowering of the pressure in the third outer container 10 by connection of an exhaust air pump. In the shown embodiment a cooling device 14 in the form of coolant pipes is arranged on the third outer container 10 for cooling of the third container wall 11. The cooling device 14 is arranged to be supplied with coolant from a refrigerating system (not shown) for cooling of the third container wall.

In the shown embodiment the first container 3 as well as the second container 6 are essentially circularly symmetrical. The first container 3 has an upper plane surface 16 and a lower plane surface 17 and an envelope surface 20 in which the first holes 9 are arranged. The second container 6 has an upper plane surface 18 and a lower plane surface 19 and an envelope surface 21 in which the second holes 15 are arranged. The second container preferably has a diameter in the interval 0.2-5 meters, and more preferably in the interval 0.5-1 meter. The distance between the envelope surface 20 of the first container 3 and the envelope surface 21 of the second container 6 is 0.01-0.3 meters, and preferably 0.03-0.06 meters.

The first container 3 and the second container 6 are both arranged fixed in relation to a first bearing part 22 on the upper side of the second container. The first bearing part 22 and thereby the first container 3 and the second container 6 are turnable in relation to a second bearing part 23 which is arranged fixed in relation to the third container 10. The first bearing part 22 and the second bearing part 23 constitutes a first bearing. The first container 3 and the second container 6 are both also arranged fixed in relation to a third bearing part 24 on the lower side of the second container 6. The third bearing part 24 and thereby the first container 3 and the second container 6 are turnable in relation to a fourth bearing part 25 which is arranged fixed in relation to the third container 10. The third bearing part 24 and the fourth bearing part 25 constitutes a second bearing. The axis of rotation is in the shown embodiment arranged essentially vertically and extends through the bearings. The inlet 2 for saltwater is arranged centrally axially through one of the bearings. The inlet 2 is arranged in an inlet pipe 26 which is turnably arranged in relation to the first bearing part 22 and the third bearing part 24. An intake hose 27 is arranged fixed in relation to the inlet pipe 26. The inlet pipe 26 extends along the axis of rotation and in the shown embodiment it extends through the first container 3 as well as the second container 6. The inlet pipe 26 is provided with a number of inlet pipe holes 28 through which saltwater from the inlet 2 may come into the first container 3. A first mitre gear 34 is arranged on the shaft of the motor 33, which gear is in engagement with a second mitre gear 35 which is arranged on the fourth bearing part 25.

The device in the shown embodiment is also provided with means to apply a voltage between the first container 3 and the second container 6. The means comprises two sliding contacts 29, 30, which are connected to external connections 31, 32, through which a voltage may be applied on the containers 3, 6. During use a suitable voltage is applied between the first container 3 and the second container 6. Surprisingly, this has been shown to drive salt ions to the container walls 4, 7. The voltage is limited so that flash-over between the containers is avoided.

In the following the function of a device according to the invention will be described. During use of the device 1 the motor 33 is made to drive the first container 3 and the second container 6 via the first mitre gear 34 and the second mitre gear 35. Simultaneously the heating means 8 is rotatable driven to produce a magnetic field in the second container 6. The produced magnetic field will produce eddy currents in the second container 6 which in turn heats the second container. The heating means 8 is driven so that the temperature of the container wall 7 of the second container 6 becomes sufficiently high to essentially immediately evaporate water which comes into contact with the container wall 7. Saltwater is transported in through the inlet 2 to the inlet pipe 26 and is transported via the inlet pipe holes 28 into the first container 3. The centrifugal force during rotation of the container 3, 6, will move the water out against the wall 4 of the first container 3. Water will be pressed out through the first holes 9 in the container wall 4 of the first container 3 to the second container 6 where it comes into contact with the container wall 7 of the second container 6 and is evaporated. The steam will be pressed out through the second holes 15 in the container wall 7 of the second container 6. According to a preferred embodiment a gas pump 36 is connected to the gas outlet 13 so that the pressure in the third container 10 may be lowered below normal atmospheric pressure. A lowered air pressure in the third container 10 will promote flow of steam through the second holes 15 in the second container wall 7. The gas pump 36 will pump out a part of the steam. It is possible to separate the water that has been pumped away after the gas pump 36. The steam that is not pumped away with the gas pump 36 will be evaporated against the container wall 11 of the third container 10, which is cooled by coolant which is pumped around in the cooling device 14.

In order to increase the efficiency of the device 1 a voltage is supplied between the external connections 31, 32, and thereby between the first inner container 3 and the second container 6. The applied voltage will surprisingly result in that the different salt ions are separated and deposited on the first inner container 3 and the second container 6, respectively, in the space between said containers 3, 6. This requires the containers to be made essentially entirely of metal.

Salt will thus accumulate in said space. When the first holes 9 in the container wall 4 of the first container 3 and the second holes 15 in the container wall 7 of the second container 6 are beginning to clog by salt the operation of the device is suitably interrupted. The device is then rinsed with saltwater without heating and voltage turned on, whereby the salt deposits will be dissolved. In order to increase the rate at which the salt is dissolved, the voltage between the first inner container and the second container may possibly be reversed in comparison to the operational state.

The described embodiments may be modified in many ways without departing from the spirit and scope of the invention which is limited only by the appended claims.

It is of course possible to manufacture a device according to the invention with a size outside the above stated intervals.

It is of course possible to achieve heating of the second container with other means than magnetisation members.

The invention claimed is:

1. A device for desalination of water, comprising:
   an inlet for saltwater;
   a first inner container with a first inner container wall arranged rotatably around an axis of rotation with holes in the first inner container wall forming a distributor for spraying saltwater on an evaporation surface;
   a condensation surface for condensation of evaporated water;
   a second container with a second container wall arranged rotatably around the axis of rotation, the inside of which constitutes an evaporation surface;
   a heater for heating of the second container and thereby also the evaporation surface
   a motor which is arranged to rotate the inner container and outer container around the axis of rotation,
   wherein the second container surrounds the first inner container and is connected fixed to the first inner container, wherein distributor for spraying salt water on the evaporation surface is constituted by first holes which are arranged in the container wall of the first inner container so that water may pass out to the second container, wherein second holes are arranged in the container wall of the second container so that steam may pass out from the second container, and wherein the condensation surface is arranged for condensation of steam which passes out through the second holes in the container wall of the second container; and
   an outlet for condensed water attached to the condensation surface.

2. The device according to claim 1, wherein the condensation surface comprises:
   a third outer container with a third container wall which surrounds the second container and which is fixed in relation to the motor, wherein the inside of the third container wall constitutes the condensation surface; and
   wherein the outlet for condensed water is attached to the third outer container.

3. The device according to claim 2 wherein the third outer container comprises:
  a gas outlet; and
  a gas pump, wherein lowering of a pressure in the third outer container is enabled by the gas pump.

4. The device according to claim 2, wherein a cooling device is arranged on the third container for cooling of the third container wall.

5. The device according to claim 1 wherein the first holes in the first container wall do not overlap the second holes in the second container wall, seen perpendicularly to any container wall surfaces.

6. The device according to claim 1 wherein:
  the first container and the second container are suspended on a first bearing on one side of the second container and a second bearing on an other side of the second container;
  the axis of rotation extends through the first bearing and second bearings; and
  the inlet for saltwater is arranged centrally axially through one of the bearings.

7. The device according to claim 6 wherein the axis of rotation is arranged essentially vertically.

8. The device according to claim 6, wherein the inlet is arranged in an inlet pipe which extends along the axis of rotation through the first container.

9. The device according to claim 8 wherein the inlet pipe is provided with a number of inlet pipe holes through which saltwater from the inlet may enter the first container.

10. The device according to claim 1 wherein the second container comprises a magnetisable material and wherein the heater comprises magnetic induction of eddy currents in the magnetisable material, which eddy currents in turn heat the second container.

11. The device according to claim 1 comprising a means for applying a voltage between the first container and the second container.

12. The device according to claim 1 wherein the second container is essentially circularly cylindrically symmetrical and has a diameter in an interval of 0.2 to 5.

13. The device according to claim 1 wherein a distance between the first container and the second container is 0.01 to −0.3 meters.

14. The device according to claim 1 wherein the first holes in the first container and the second holes in the second container have a length in a plane of the container wall which is 0.002- to 0.05 meters.

15. The device according to claim 1 wherein the second container is essentially cylindrically symmetrical and has a diameter from 0.5 to 1 meters.

16. The device according to claim 1 wherein the first holes in the first container and the second holes in the second container have a length in a plane of the container wall which is 0.005 to 0.01 meters.

17. The device according to claim 1 wherein a distance between the first container and the second container is 0.03 to 0.06 meters.

* * * * *

UNITED STATES PATENT AND TRADEMARK OFFICE
CERTIFICATE OF CORRECTION

| | | |
|---|---|---|
| PATENT NO. | : 8,608,911 B2 | Page 1 of 1 |
| APPLICATION NO. | : 13/697457 | |
| DATED | : December 17, 2013 | |
| INVENTOR(S) | : Rolf Ingeson | |

It is certified that error appears in the above-identified patent and that said Letters Patent is hereby corrected as shown below:

In the Claims

Column 8, Line 10, Claim 12:

After "container is essentially"
Delete "circularly"

Signed and Sealed this
Tenth Day of June, 2014

Michelle K. Lee
*Deputy Director of the United States Patent and Trademark Office*